United States Patent
Loew

(10) Patent No.: US 7,262,833 B2
(45) Date of Patent: Aug. 28, 2007

(54) CIRCUIT FOR ADDRESSING A MEMORY

(75) Inventor: Andreas Loew, Gross-Gerau (DE)

(73) Assignee: Thomson Licensing, Boulogne, Billancourt (FR)

( * ) Notice: Subject to any disclaimer, the term of this patent is extended or adjusted under 35 U.S.C. 154(b) by 9 days.

(21) Appl. No.: 10/571,191

(22) PCT Filed: Aug. 23, 2004

(86) PCT No.: PCT/EP2004/009394

§ 371 (c)(1),
(2), (4) Date: Mar. 9, 2006

(87) PCT Pub. No.: WO2005/024624

PCT Pub. Date: Mar. 17, 2005

(65) Prior Publication Data

US 2007/0008764 A1    Jan. 11, 2007

(30) Foreign Application Priority Data

Sep. 11, 2003 (DE) ................................ 103 42 255

(51) Int. Cl.
*G11C 8/00* (2006.01)
(52) U.S. Cl. .................. 355/233; 365/194; 365/230.05
(58) Field of Classification Search ........... 365/189.01, 365/194, 233, 230.05, 236, 189.08
See application file for complete search history.

(56) References Cited

U.S. PATENT DOCUMENTS

| | | | | |
|---|---|---|---|---|
| 5,636,176 A | * | 6/1997 | Hashimoto et al. | ......... 365/233 |
| 6,075,392 A | * | 6/2000 | Sandner | ....................... 327/145 |
| 6,542,426 B2 | * | 4/2003 | Jung et al. | .................. 365/222 |
| 6,735,667 B2 | * | 5/2004 | Hashimoto et al. | ......... 711/105 |
| 2005/0036678 A1 | * | 2/2005 | Loew | ......................... 382/162 |

FOREIGN PATENT DOCUMENTS

| | | |
|---|---|---|
| DE | 2712775 | 7/1978 |
| DE | 19819863 | 11/1999 |
| JP | 61-269543 | 11/1986 |
| WO | WO 02/14992 | 2/2002 |

OTHER PUBLICATIONS

Patent Abstracts of Japan, vol. 0111, No. 22, Apr. 16, 1987 & JP 61-269543 (See Ref. AD).
Search Report Dated Nov. 12, 2004.

* cited by examiner

*Primary Examiner*—Richard T. Elms
*Assistant Examiner*—Hien Nguyen
(74) *Attorney, Agent, or Firm*—Joseph J. Laks; Ronald H. Kurdyla; Vincent E. Duffy

(57) ABSTRACT

A circuit is proposed which has a memory to which input data can be written at different write addresses with a first clock rate and from which output data can be read at different read addresses with a second clock rate. The memory can be fed a write reset pulse that resets the write address to an initial value. In addition, the memory can be fed a read reset pulse by means of which the data are output in a fixed temporal relationship. Finally, the circuit proposed is provided with switching means in order to derive the read reset pulse from the write reset pulse. This ensures that the two reset pulses cannot occur simultaneously.

8 Claims, 2 Drawing Sheets

CIRCUIT FOR ADDRESSING A MEMORY

Figure 1:
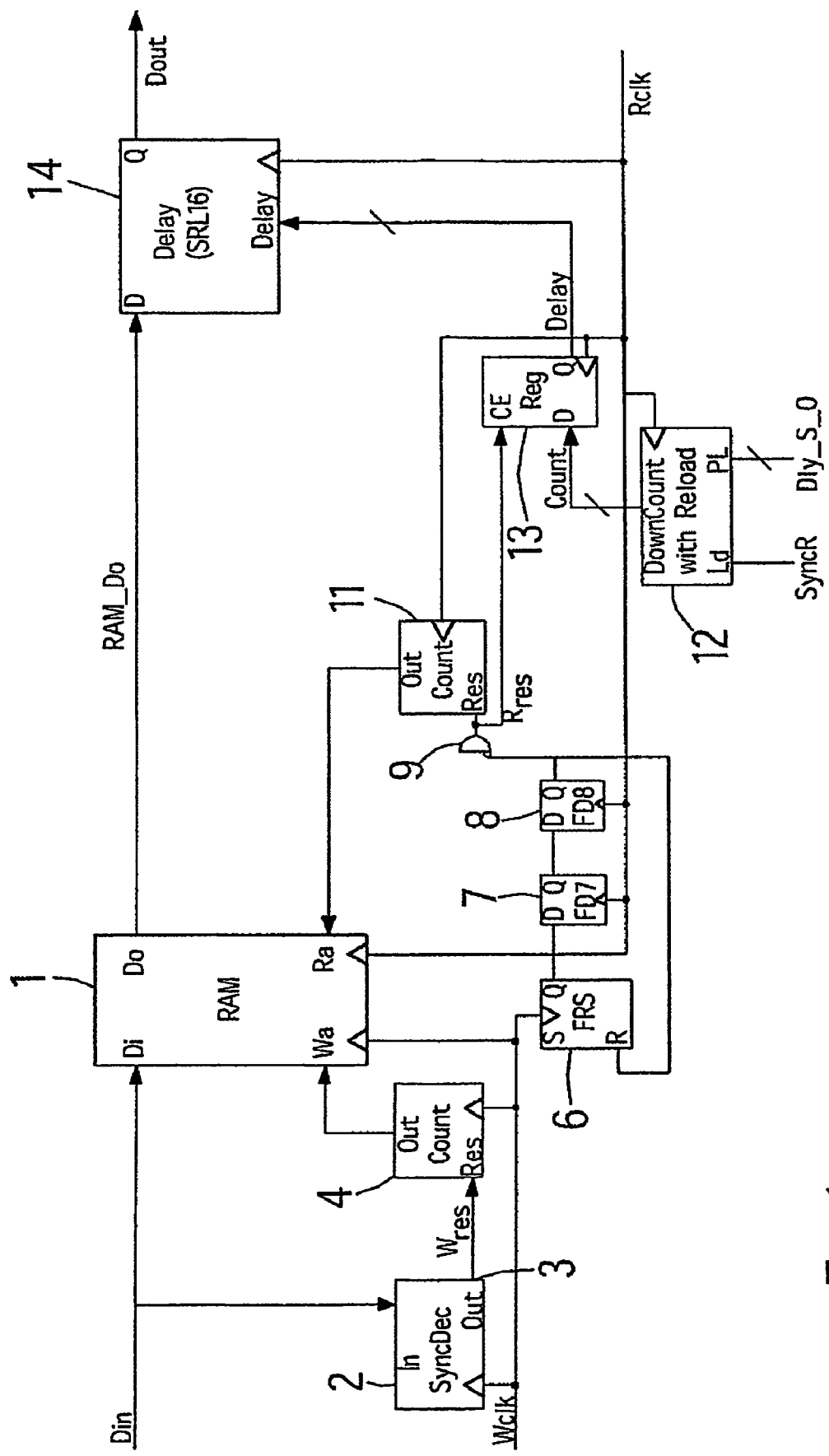

This application claims the benefit, under 35 U.S.C. § 365 of International Application PCT/EP04/009394, filed Aug. 23, 2004, which was published in accordance with PCT Article 21(2) on Mar. 17, 2005 in English and which claims the benefit of German application No. 10342255.2, filed Sep. 11, 2003.

The invention relates to a circuit for addressing a memory. In particular, the invention relates to a circuit according to the preamble of patent claim 1.

In the processing of digital video data, it is generally necessary to transfer data streams between different processing units. In the course of the data transfer via different channels, propagation time shifts may occur in the individual transfer paths. In the case of data streams that are reset with such a propagation time shift, it is necessary, therefore, first of all to synchronize the data streams prior to the further processing of the data. Such difficulties occur for example in film scanners or other apparatuses for processing video data. The data are generally synchronized with the aid of a so-called FiFo memory ("First-in, First-out"), to which the data are written with a write clock rate and from which the data are read out again with a read clock rate that is also different, if appropriate.

However, the aforementioned difficulties are not restricted to video data, but rather occur quite generally wherever digital data streams are transferred between different processing units.

The invention proposes a circuit which enables the desired synchronization of the data streams to be achieved.

The circuit according to the invention has a memory to which input data can be written at different write addresses with a first clock rate and from which output data can be read at different read addresses with a second clock rate. The memory can be fed a write reset pulse that resets the write address to an initial value. In addition, the memory can be fed a read reset pulse that resets the read address to an initial value. Finally, the circuit according to the invention is provided with switching means in order to derive the read reset pulse from the write reset pulse. This ensures that the two reset pulses cannot occur simultaneously.

Expediently, the circuit comprises a detector set up in order to detect synchronization data from the input data in order to generate the write reset pulse. The synchronization data are for example a synchronization word embedded in the input data.

In order to obtain a fixed temporal relationship of the data read from the memory with regard to a read-side start pulse, the circuit may comprise an adjustable delay element.

In an advantageous manner, the circuit has a counter that is started by the read-side start pulse and counts down proceeding from a start value as far as an end value. In this case, the circuit is expediently provided with a storage means, in which the value of the counter is stored if a read-side reset pulse occurs.

In a development of the invention, a connection may be provided between the storage means and the adjustable delay element, said connection being set up in order to write the stored value of the counter as a delay value to the adjustable delay element.

In one embodiment of the invention, switching means are provided in order to detect from the write-side reset pulse a pulse edge that triggers the generation of a read-side reset pulse. In particular, a rising pulse edge is appropriate for this purpose.

In an advantageous manner, the circuit according to the invention is provided with counters that generate the write and read address, respectively, of the memory. In this case, it is expedient if the counters are clocked with the write and read clock signal, respectively.

Figure 2:
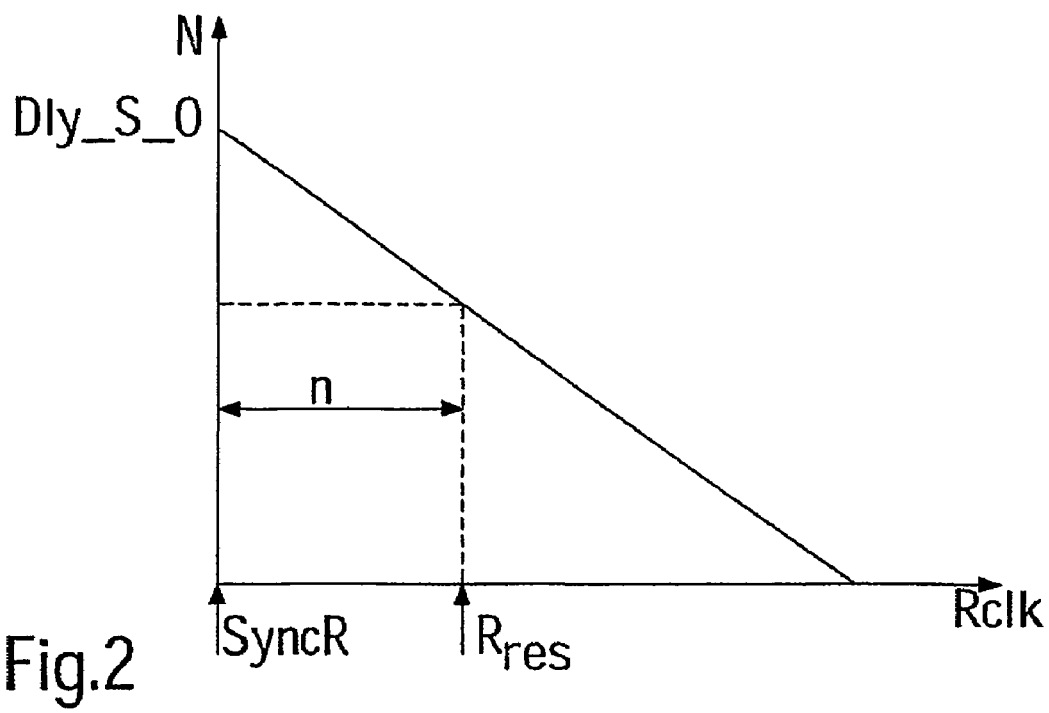
Figure 3:
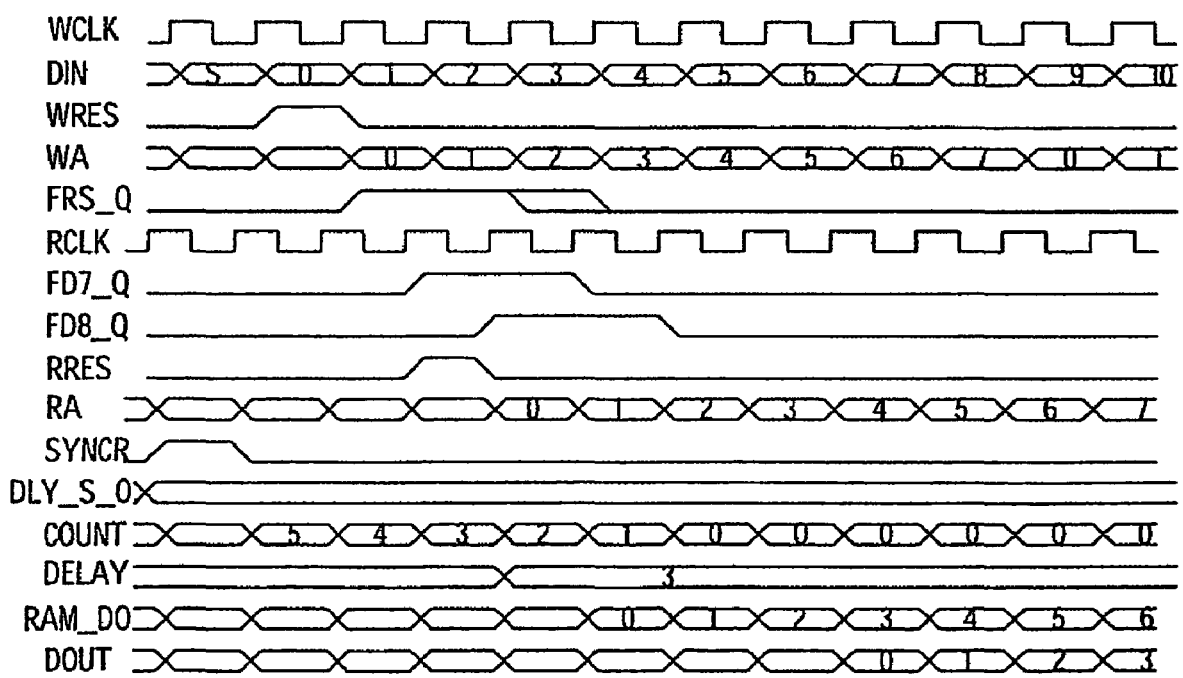

An exemplary embodiment of the circuit according to the invention is illustrated in the drawing, in which, FIG. 1 shows a schematic block diagram of the circuit according to the invention, FIG. 2 shows counter contents of a counter in the circuit from FIG. 1, and FIG. 3 shows a schematic timing diagram of the signals in the circuit from FIG. 1.

FIG. 1 shows a schematic block diagram of an exemplary embodiment of the circuit according to the invention for a so-called FiFo memory 1 ("First-in, First-out"). Although the individual functional units are illustrated as separate blocks in FIG. 1, this does not mean that these functional units have to be realized as individual electronic modules. Rather, a plurality or else all of the functional units may be integrated in a single module.

A digital input data stream Din is written to the memory 1 with a write clock rate Wclk. The input data stream Din also contains a synchronization word or a synchronization phrase that is detected by a decoder 2. If a synchronization phrase occurs during a write clock cycle, the decoder 2 generates a write-side reset signal Wres at an output 3, as a result of which a counter 4 that is counted up by the write clock Wclk is reset. The output signal of the counter 4 specifies the write address Wa for the input data Din in the memory 1.

The output signal of the decoder 2 is also fed to the set input of an FRS flip-flop 6, the output of which is connected to a D flip-flop 7. The output of the flip-flop 7 is connected to a further flip-flop 8 and also to a first input of an AND gate 9. The second input of the AND gate 9 is an inverting input connected to the output of the flip-flop 8. The output of the flip-flop 8 is furthermore connected to a reset input of the flip-flop 6. A read clock signal Rclk is connected to the flip-flops 7 and 8 and also to the memory 1.

The circuit of the flip-flops 6, 7, 8 and the AND gate 9 causes the output of the AND gate 9 to go "HIGH" when a rising edge of the write clock signal Wclk occurs.

The output of the AND gate 9 is connected to the reset input of a counter 11 that is likewise connected to the read clock signal Rclk and is counted up by the latter. During operation, the counter 11 counts up with the read clock rate Rclk until a rising edge of the write clock signal Wclk is detected and the counter 11 is reset to zero by the AND-gate. The output of the counter 11 is connected to the memory 1 and prescribes the read address Ra at which output data Dout are read from the memory 1.

In order to produce a fixed timing relationship with respect to a start pulse SyncR on the read-side printed circuit board, a down-counter 12 is provided which is loaded with a start value Dly_S_O, which specifies the phase angle of the data on the read side. The read clock signal Rclk is fed to the down-counter 12. The down-counter 12 is started by the start pulse SyncR and counted down with the clock rate of the read clock signal Rclk. If a read-side reset pulse Rres occurs, the present counter reading Vdly is stored in a register 13. The output signal of the AND gate 9 is applied to a further input of the register 13, said output signal forming the read-side reset signal. As soon as a rising edge of the write clock signal Wclk occurs, the output signal of the AND gate 9 goes "HIGH" and initiates the writing of the counter reading Vdly of the down-counter to the register 13. The stored counter reading Vdly is fed to an adjustable delay element 14 and has the function of a delay value for the delay element 14.

The delay element 14 is designed for example as a shift register in which data Dout read from the memory 1 are written to the register at a location prescribed by the delay value Vdly. The data are then shifted through the register with the clock rate of the read clock Rclk, thereby realizing a specific delay time. For this purpose, the delay element 14 is likewise connected to the read clock Rclk. Such programmable delay elements can be obtained for example from the company Xilinx Inc., San José, Calif., USA. A suitable module is the type SRL16E, for example.

The function of the delay element 14 is illustrated in FIG. 2. A value Dly_S_O is loaded into the counter 12 and counted down with the read clock rate Rclk. When the next read-side reset pulse Rres occurs, the counter reading Vdly is stored in the register 13 and transferred into the delay element 14. This means that the delay element 14 produces a fixed phase relationship between the read-side data Dout and the start pulse SyncR by virtue of an ever larger delay value Vdly being written to the delay element 14 the faster a read-side reset pulse Rres follows a start pulse SyncR, and vice versa.

The time duration between the occurrence of the read-side start pulse SyncR and the read-side reset pulse Rres is illustrated by a number of n read clock pulses in FIG. 2.

FIG. 3 illustrates the impulse sequence of the signals that are exchanged between the individual components of the circuit shown in FIG. 1.

The exemplary embodiment described in connection with FIG. 1 and FIG. 2 is suitable for applications in which the rate of the input data Din and the rate of the output data Dout are identical apart from temporal fluctuations. In this case, the memory 1 never overflows and always contains enough valid data. In other words, neither an "overflow" nor an "underflow" occurs. In applications in which this is not ensured, additional control facilities are added. On the write side, by way of example, a so-called "handshake" signal is known from the prior art, which signal permits data to be written to the memory 1 only when free memory locations are available. On the read side, a so-called "data valid" signal is often used, which permits data to be read from the memory 1 only when valid data are available in the memory 1.

The invention claimed is:

1. A circuit for addressing a memory, to which memory, independently from each other, input data can be written at individual write addresses at a first clock rate and output data can be read at different read addresses at a second clock rate, wherein a write reset signal is supplied to the circuit, which reset signal resets the write address to an initial value, wherein a read reset signal is supplied to the circuit, which read reset signal resets the read address to an initial value, wherein switching means are provided, which derive the read reset signal from the write reset signal, and wherein the circuit includes an adjustable delay element producing a fixed temporal relationship of the read-out data with regard to a read-side start signal.

2. The circuit as claimed in claim of claim 1, wherein the circuit includes a detector adapted to detect synchronization data from the input data for generating the write reset signal.

3. The circuit of claim 1 includes a counter that is started in dependence of the start signal and, beginning from a start value, counts down to an end value.

4. The circuit of claim 3, wherein the circuit includes-a storage means, in which the present value of the counter is stored if a read-side reset signal is present.

5. The circuit of claim 3, wherein a connection is provided between the storage means and the adjustable delay element, said connection being set up in order to write the stored value of the counter as a delay value to the adjustable delay element.

6. The circuit of claim 1, wherein the switching means are adapted to detect from the write-side reset signal a pulse edge that triggers the generation of a read-side reset signal.

7. The circuit of claim 6, wherein the counters are clocked with the write and read clock signal, respectively.

8. The circuit of claim 1, wherein counters are provided that generate the write and read address, respectively, of the memory.

* * * * *